United States Patent
Chiang

(10) Patent No.: US 8,575,793 B2
(45) Date of Patent: Nov. 5, 2013

(54) VOICE COIL MOTOR WITH ROLLERS

(75) Inventor: Shun-Fan Chiang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 379 days.

(21) Appl. No.: 12/954,619

(22) Filed: Nov. 25, 2010

(65) Prior Publication Data

US 2012/0091827 A1   Apr. 19, 2012

(30) Foreign Application Priority Data

Oct. 18, 2010   (TW) .................................. 99135445

(51) Int. Cl.
*H02K 33/00*   (2006.01)
*H02K 35/00*   (2006.01)
*H02K 41/02*   (2006.01)

(52) U.S. Cl.
USPC ......... 310/12.16; 310/12.31; 310/89; 310/25; 310/36

(58) Field of Classification Search
USPC ................. 310/12.15, 12.31, 25, 36
IPC ............................................ H02K 33/00,41/02
See application file for complete search history.

(56) References Cited

U.S. PATENT DOCUMENTS

| | | | | |
|---|---|---|---|---|
| 7,731,003 B2* | 6/2010 | Su et al. | | 188/162 |
| 2002/0079747 A1* | 6/2002 | Teramachi et al. | | 310/12 |
| 2008/0036304 A1* | 2/2008 | Ho et al. | | 310/12 |
| 2008/0259470 A1* | 10/2008 | Chung | | 359/823 |
| 2010/0098394 A1* | 4/2010 | Ishihara et al. | | 396/55 |
| 2010/0128372 A1* | 5/2010 | Wang | | 359/824 |
| 2010/0142065 A1* | 6/2010 | Liao | | 359/824 |

* cited by examiner

*Primary Examiner* — Quyen Leung
*Assistant Examiner* — Terrance Kenerly
(74) *Attorney, Agent, or Firm* — Altis & Wispro Law Group, Inc.

(57) ABSTRACT

A voice coil motor includes a mount, a movable unit and a number of rollers. The mount includes a through hole, a number of recesses opposing the through hole, and a number of magnetic blocks mounted in the through hole. The movable unit includes a barrel and a coil of wire surrounding the barrel. The movable unit is movably received in the through hole of the frame and surrounded by the magnetic blocks. The rollers are rotatably received in the respective recesses and come in contact with the barrel. The rollers hold the movable unit in position when no magnetic force needed to be applied on the movable unit.

10 Claims, 3 Drawing Sheets

VOICE COIL MOTOR WITH ROLLERS

BACKGROUND

1. Technical Field

The present disclosure relates to voice coil motors, and particularly to a voice coil motor with rollers.

2. Description of Related Art

Voice coil motors are widely used as actuators in electronic devices, such as cameras and mobile phones.

A typical voice coil motor includes a mount and a movable barrel movably received in the mount. Using an auto focus process for example, when the movable barrel is moved to the focus position, the power supply should remain steady to hold the movable barrel in position for the image capturing period. Therefore, the total electrical consumption cannot be lowered.

What is needed, therefore, is a voice coil motor which can overcome the above shortcomings.

BRIEF DESCRIPTION OF THE DRAWINGS

Many aspects of the present voice coil motor can be better understood with reference to the following drawings. The components in the drawings are not necessarily drawn to scale, the emphasis instead being placed upon clearly illustrating the principles of the present voice coil motor. Moreover, in the drawings, like reference numerals designate corresponding parts throughout the several views.

DETAILED DESCRIPTION

Embodiments of the present voice coil motor will now be described in detail below and with reference to the drawings.

Figure 1:
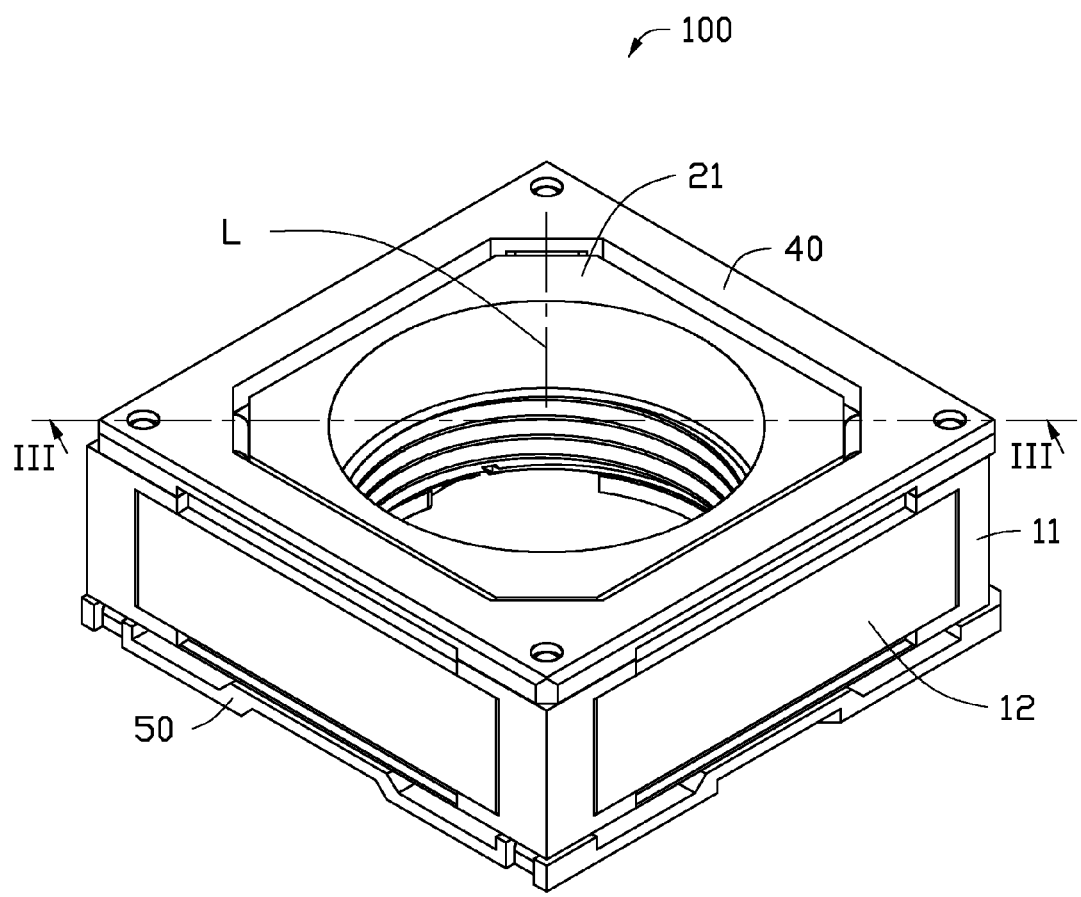
FIG. 1 is a perspective view of a voice coil motor in accordance with one embodiment.
Figure 2:
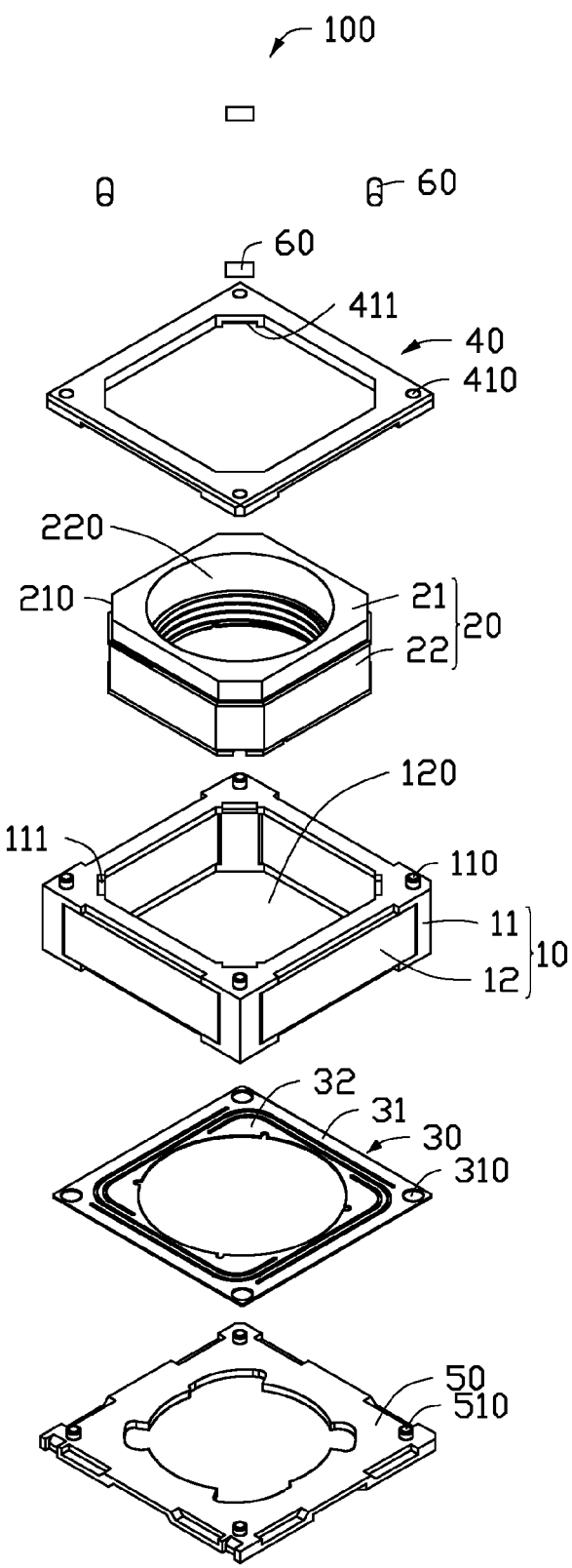
FIG. 2 is an exploded view of the voice coil motor of FIG. 1.
Figure 3:
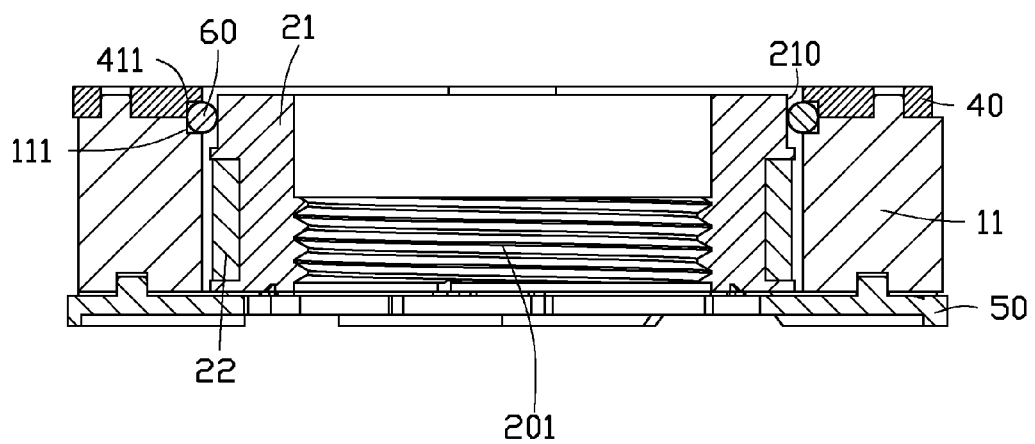
FIG. 3 is a cross sectional view of the voice coil motor shown in FIG. 1, taken along the III-III line.

Referring to FIGS. 1 to 3, a voice coil motor 100 in accordance with one embodiment, is provided. The voice coil motor 100 includes a mount 10 (fixing unit), a movable unit 20, an elastic plate 30, a cover plate 40, a base 50 and a number of rollers 60.

The base 50 is mounted to the bottom of the mount 10, and the cover plate 40 is mounted to the top of the mount 10. The mount 10 has a receiving space 120 defined therein. The barrel holder 20 and the elastic plate 30 are received in the receiving space 120 of the mount 10.

The mount 10 includes a frame 11 and four magnetic blocks 12. The frame 11 is substantially in a cuboid shape, and defines a central axis L which, is also the central axis of the receiving space 120. Four sides of the frame 11 are hollowed out, and the magnetic blocks 12 are respectively mounted on the four sides of the frame 11.

Four corners of the top of the frame 11 each have a protrusion 110 formed thereon, and a first groove 111 formed therein. A lengthwise direction of each of the protrusions 110 is substantially parallel with the central axis L. The first grooves 11 oppose the receiving space 120.

Four corners of the cover plate 40 each have an engagement hole 410 formed therein, and a second groove 411 formed therein. When the cover plate 40 is mounted at the top of the frame 11, the protrusions 110 are engaged in the engagement holes 410, and the second grooves 411 respectively oppose the first grooves 111. An adhesive may be applied between the cover plate 40 and the frame 11 to further fix the cover plate 40 to the frame 11.

The movable unit 20 is movably received in the receiving space 120 of the frame 11, and is movable along the central axis L of the frame 11. The movable unit 20 includes a barrel 21 and a coil of wire 22 surrounding the barrel 21. The barrel 21 has a second receiving space 220 defined therein. A thread 201 is formed in the inner wall of the second receiving space 220, and provides a threaded engagement if it is needed. The barrel 21 further has four flat cutting surfaces 210 formed on an outer wall thereof. In the present embodiment, the cutting surfaces 210 are formed from a top end of the barrel 21, and the cutting surfaces 210 are spaced the coil of wire 22 by an outer wall of the barrel 21 (see FIG. 3).

The number of the rollers 60 is four, corresponding to the four first grooves 111 and the four second grooves 411. A recess is formed by the first groove 111 and second groove 411, and the recess opposes the barrel 21. The rollers 60 are partially received in the respective recesses, and come in contact with the respective cutting surface 210 of the barrel 21.

In other embodiments, the number of the first grooves 111, the second grooves 411 and the rollers 60 can vary, the first grooves 111 and the second grooves 411 can be formed at the four sides of the frame 11 and the cover plate 40. In order to be in balance, a number of the first grooves 111 are symmetrical about the central axis L of the frame 11. The second grooves 411 only need to match with the first grooves 111 to form the receiving spaces therebetween.

The elastic plate 30 includes a peripheral gasket 31 and a central elastic portion 32. The gasket 31 has four engagement holes 310 formed therein. The elastic portion 32 is connected to the barrel 21. The elastic portion 32 may be metallic, and thus a current can be applied to the coil of wire 22 through the elastic portion 32.

The base 50 has four protrusions 510 formed thereon, and the protrusions 510 extend through and are engaged in the engagement holes 310 of the gasket 31.

In the present embodiment, the voice coil motor 100 serves as a motor in a camera module for driving a lens module for auto focus. Therefore, each of the mount 10, the movable unit 20, the elastic plate 30, the cover plate 40, and the base 50 has a central through hole formed therein, for facilitating a light to pass through. The central through holes of the mount 10 and the movable unit 20 are respectively received in the receiving spaces 120 and 220. A lens module, which usually has a lens barrel and at least one lens mounted in the lens barrel, can be mounted in the receiving space 220 of the movable unit 20, such that the lens module is driven to move.

In an auto focus, the coil of wire 22 is electrified with a current in a first direction, a Lorenz force is generated between the coil of wire 22 and the magnetic blocks 12. With this force, the movable unit 20 is able to be moved in a direction along the central axis L in the frame 11, and the rollers 60 are rotated in that position as the movable unit 20 is moved along.

The rollers 60 provide a friction force to the movable unit 20. Such that, when the movable unit 20 reaches a focus position, the coil of wire 22 can be powered off, and the friction force can hold the movable unit 20 in the focus position. In this position, because of the rollers 60, the movable unit 20 cannot be drawn back to an original position by the elastic portion 32. The coil of wire 22 needs to be electrified with a current in an opposite direction, before the movable unit 20 can be moved back to the original position. In this process, the elastic force of the elastic portion 32 can help draw back the movable unit 20 to the original position, such that the current in the second direction can be less than the above current in the first direction.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A voice coil motor, comprising:
    a fixing unit comprising a frame defining a receiving space, and a plurality of magnetic blocks mounted in the receiving space, the frame having a plurality of first grooves formed therein;
    a movable unit comprising a barrel and a coil of wire surrounding the barrel, the movable unit being movably received in the receiving space of the frame and surrounded by the magnetic blocks;
    a base mounted to a bottom of the frame;
    an elastic plate having an elastic portion connected to the movable unit, and a gasket fixed to the base;
    a cover plate mounted to a top of the frame, the cover plate having a plurality of second grooves formed therein adjacent to the respective first grooves, the first grooves and the second grooves cooperatively constituting a plurality of recesses; and
    a plurality of rollers rotatably received in the respective recesses and coming into contact with the barrel, the rollers being unmovable along a moving direction of the movable unit, the rollers configured for holding the movable unit in position when no magnetic force is applied on the movable unit.

2. The voice coil motor of claim 1, wherein the frame has a cuboid shape, the magnetic blocks are mounted on four sides of the frame and face toward the movable unit.

3. The voice coil motor of claim 1, wherein the elastic portion is metallic, the coil of wire is electrifiable through the elastic portion.

4. The voice coil motor of claim 1, wherein the top of the frame has a plurality of protrusions, the cover plate has a plurality of engagement holes formed therein, the protrusions are engaged in the respective engagement holes.

5. The voice coil motor of claim 1, wherein the base has a plurality of protrusions, the gasket of the elastic plate has a plurality of engagement holes formed therein, the protrusions are engaged in the engagement holes.

6. The voice coil motor of claim 1, wherein the barrel has a receiving space defined therein, and a thread formed in the inner wall of the receiving space of the barrel.

7. The voice coil motor of claim 1, wherein the barrel has four flat cutting surfaces formed on an outer wall thereof, and the rollers are in contact with the respective cutting surfaces.

8. A voice coil motor, comprising:
    a mount comprising a through hole defined therein, a plurality of recesses surrounding and facing toward the through hole, and a plurality of magnetic blocks mounted in the through hole,
    a movable unit comprising a barrel and a coil of wire surrounding the barrel, the movable unit being movably received in the through hole of the frame and surrounded by the magnetic blocks; and
    a plurality of rollers rotatably received in the respective recesses and coming in contact with the barrel, the rollers being unmovable along a moving direction of the movable unit, the rollers configured for holding the movable unit in position when no magnetic force is applied on the movable unit.

9. The voice coil motor of claim 8, wherein the barrel has a receiving space defined therein, and a thread formed in an inner wall of the barrel in the receiving space.

10. The voice coil motor of claim 8, wherein the barrel has four flat cutting surfaces formed on an outer wall thereof, and the rollers are in contact with the respective cutting surfaces.

* * * * *